United States Patent [19]
Peck

[11] 4,010,323
[45] Mar. 1, 1977

[54] DIGITAL TIMING RECOVERY
[75] Inventor: Richard John Peck, Eatontown, N.J.
[73] Assignee: Bell Telephone Laboratories, Incorporated, Murray Hill, N.J.
[22] Filed: Oct. 29, 1975
[21] Appl. No.: 626,658
[52] U.S. Cl. .............................. 178/88; 178/69.1; 325/320; 329/122
[51] Int. Cl.² .................. H04L 7/00; H04L 27/22
[58] Field of Search ............. 178/88, 67, 69.5 R; 325/30, 320, 419, 420; 329/104, 105, 122

[56] References Cited
UNITED STATES PATENTS

| | | | |
|---|---|---|---|
| 3,020,479 | 2/1962 | Logan | 328/13 |
| 3,209,265 | 9/1965 | Baker et al. | 328/63 |
| 3,412,206 | 11/1968 | Bizet et al. | 325/320 |
| 3,479,457 | 11/1969 | Oswald | 325/320 |
| 3,485,949 | 12/1969 | De Haas | 325/320 |
| 3,514,702 | 5/1970 | Nahay et al. | 178/67 |
| 3,619,662 | 11/1971 | Vachon | 178/69.5 R |
| 3,729,684 | 4/1973 | Shuda | 325/320 |
| 3,739,277 | 6/1973 | Schneider et al. | 325/320 |
| 3,758,870 | 9/1973 | Schmitt et al. | 325/320 |
| 3,938,052 | 2/1976 | Glasson et al. | 325/320 |
| 3,970,945 | 7/1976 | Knapp | 178/88 |

Primary Examiner—Robert L. Griffin
Assistant Examiner—Marc E. Bookbinder
Attorney, Agent, or Firm—Joseph P. Kearns

[57] ABSTRACT

Sample timing recovery in a differentially coherent phase-shift keyed data transmission system is accomplished through the use of digital techniques. Samples of received phase-modulated signal waves taken at a rate high with respect to the carrier frequency are applied to a delay medium advantageously implemented by a shift register. Stored samples spaced by known carrier phase differences are compared for the purpose of detecting phase changes. Digital indications of such phase changes resulting from differentiation of comparator outputs are then effective to control a phase-locked oscillator and provide a substantially jitter-free timing recovery wave without using excess bandwidth for the transmitted wave.

6 Claims, 1 Drawing Figure

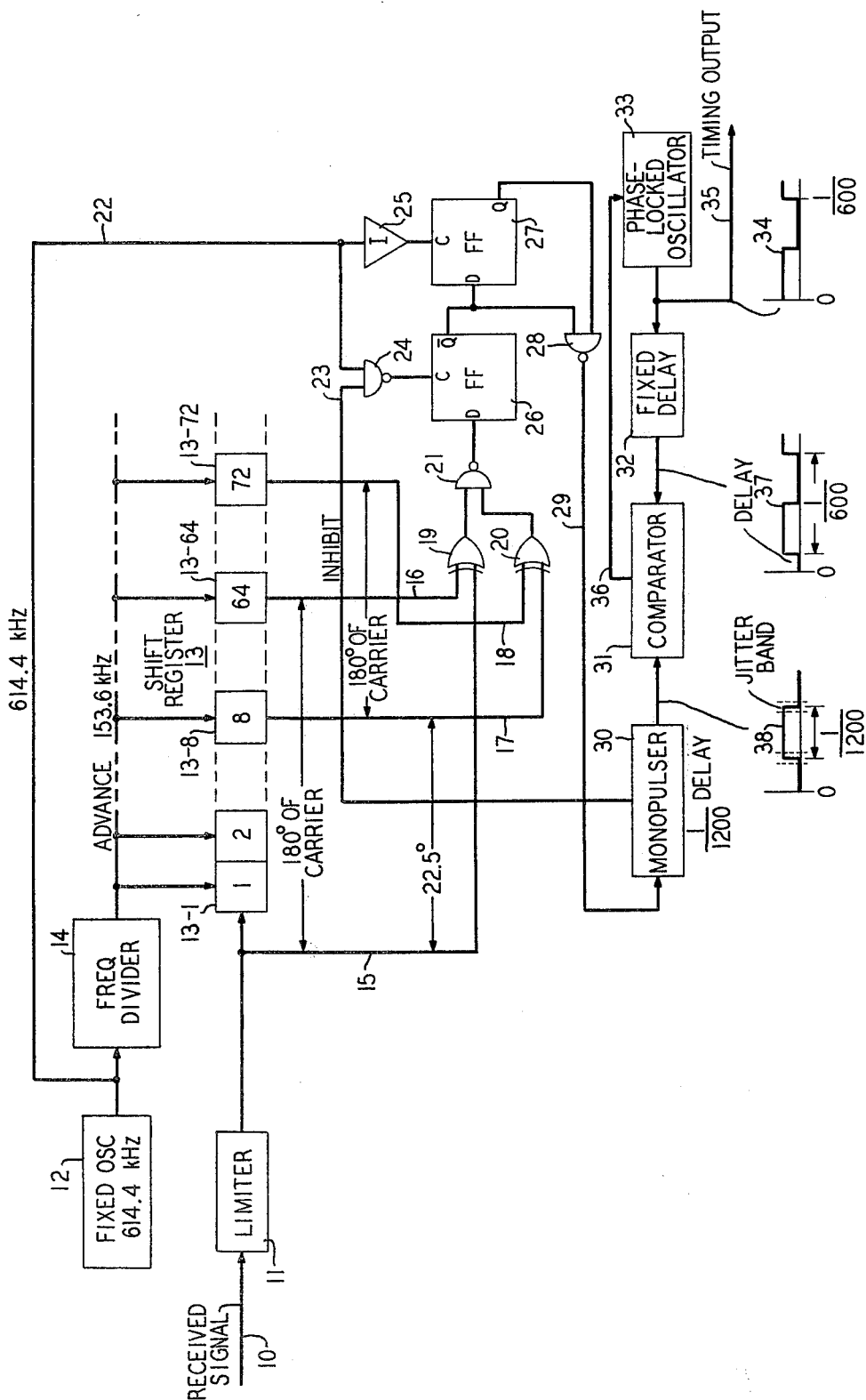

DIGITAL TIMING RECOVERY

FIELD OF THE INVENTION

This invention relates generally to sample timing recovery in differentially coherent phase-shift keyed (PSK) data transmission systems and, in particular, to digital implementation of sample timing recovery in receivers for such data transmission systems.

CROSS REFERENCE TO RELATED APPLICATIONS

This invention is related to my U.S. pat. application Ser. No. 626,657 entitled "Digital Modulator" and that of S. Y. Tong Ser. No. 626,659 entitled Digital Demodulator" both filed of even data herewith.

BACKGROUND OF THE INVENTION

In the copending patent applications cited above respective transmitters and receivers for differentially coherent PSK data transmission systems are disclosed. The transmitter described by me employs a substantially digital implementation of a PSK modulator using a quantized "staircasing" arrangement compatible with large-scale integrated-circuit (LSI) techniques. The output wave produced after low-pass filtering is characterized by a substantially constant frequency with discrete phase changes occurring at synchronous modulation, i.e., baud, intervals. The information to be transmitted is encoded in phase changes measured between the centers of successive modulation, signaling or baud intervals. Due to this differential encoding no absolute phase reference need be transmitted with the output wave.

In his copending application Tong describes a receiver for a differentially coherent PSK signal wave using comparison detection techniques implemented by a multistage shift register and a pair of binary counters. Present and delayed replicas of received signal samples taken in successive baud intervals are correlated in exclusive-OR gates, whose outputs drive the binary counters. According to whether or not the counters have reached predetermined count thresholds the binary nature of the transmitted data bit is ascertained. The instant of time at which the observation of the attainment or not of the count threshold is important from the standpoint of the validity and freedom from error of the resultant data decision. Tong broadly indicates a baud-rate clock for sampling the counter outputs. Tong's digital demodulator is also compatible with LSI techniques.

It is an object of this invention to provide an improved sample timing recovery circuit for differentially coherent PSK data transmission systems.

It is another object of this invention to provide a timing recovery circuit for differentially coherent PSK data transmission systems using digital apparatus compatible with LSI techniques.

It is a further object of this invention to provide a timing recovery circuit for a differentially coherent PSK data transmission system using correlation techniques.

SUMMARY OF THE INVENTION

In accordance with this invention, a sample timing recovery circuit for a differentially coherent PSK data receiver comprises an amplitude limiter for squaring up received data signals, a multistage shift register for serially storing periodic samples taken at a rate higher than the baud rate of the squared data signals, a pair of correlators for the instantly received signals and replicas thereof delayed by intervals related to the frequency of the signal carrier wave, a coincidence circuit combining the outputs of the correlators, a differentiator, a monopulser and a digital phase locked loop. The shift register serves as digitally implemented delay medium.

In an illustrative embodiment for a differentially encoded PSK data transmission system, wherein serial data are encoded in dibit-pairs on each of the discrete phase changes of $90m$ electrical degrees, where $m = 0$, 1, 2 and 3, i.e., 0°, 90°, 180°, and 270°, encoding dibits 00, 01, 11 and 10 respectively, sampling rate is selected such that each half-cycle of the carrier wave is sampled at least four times and preferably several times that number to reduce quantizing error and thus to insure adequate noise performance. Correlations are made between the instant input sample and samples delayed by one half-cycle (180°) of the carrier wave and also between a sample delayed from the input by a predetermined amount and a further sample delayed by an additional one half-cycle (180°) of the carrier wave. For a constant phase carrier wave free of noise each of these correlations is negative. However, when a valid phase change occurs, two positive correlations will be observed. Sporadic correlations due to noise can occur at any time in either correlator. It is clear that when two simultaneous positive correlations occur the phase of the carrier wave has changed by the predetermined amount. Consequently, the results of the two correlations are combined to provide a positive phase change indication. Since the phase change occurs at or near the beginning of each baud interval and there are two cycles of carrier wave for each baud interval, a phase-change indication from the correlators is generated within the first quarter of most baud intervals (every baud interval except that encoding the dibit 00). A monopulser triggered by the first such indication in each baud interval then generates a pulse stretched over half a baud interval, i.e., has a duration equal to a half-cycle of the timing wave. This pulse is compared with the output of a phaselocked oscillator having a nominal frequency equal to the baud rate and by an add/delete arrangement is brought into average phase alignment with the baud intervals of the received signal wave. The purpose of the phase-locked oscillator is to smooth out and largely eliminate the phase jitter superposed on the received signal. A uniform supplementary delay can be built into the oscillator loop to compensate for any skew or offset between the transition between baud intervals and the occurrence of the average phase change in the received wave.

In the illustrative four-phase differentially encoded PSK data transmission system it is assumed that the baud rate is 600 and the carrier frequency is 1200 Hz.

BRIEF DESCRIPTION OF THE DRAWING

The objects and features of this invention will become more apparent from a consideration of the following detailed description and the single FIGURE of the drawing showing a block diagram of a digital timing recovery arrangement for a differentially encoded PSK data transmission system, according to this invention.

DESCRIPTION OF THE ILLUSTRATIVE EMBODIMENT

In this single FIGURE of the drawing there is shown a sample timing recovery circuit comprising received PSK signal input lead 10, limiter 11, multistage shift register 13 having taps on leads 15 through 18, fixed oscillator 12, frequency divider 14, exclusive-OR gates 19 and 20, NAND-gates 21, 24 and 28, inverter 25, flip-flops 26 and 27, monopulser 30, comparator 31, fixed delay 32, phase-locked oscillator 33 and output line 35.

Shift register 13 is substantially the same as that described in the copending Tong patent application, but with additional taps on stages 8, 64 and 72. At the advance rate of 153.6 kHz derived from fixed oscillator 12 at 614.4 kHz through divide-by-four frequency divider 14 256 samples (the same number employed by Tong in his demodulator) are effectively taken in each baud interval. Since there are two cycles of the carrier wave in each baud interval, one hundred twenty-eight samples are taken in each carrier-wave cycle. Accordingly, the sample at the tap of the 64th stage is 180 electrical degrees from that at the input provided no change in phase has taken place. If, however, a change in phase does take place, the normal opposite phase condition between taps separated by 64 samples will be altered. Furthermore, the eighth tap is approximately 22.5° from the input and 72nd tap is 180° from the eighth tap. Thus, the eighth and 72nd taps provide a second set of taps at which the 180° phase difference can be monitored.

The samples at the input on lead 15 and at the 64th tap on lead 16 are applied to exclusive-OR gate 19, whose output is high when both inputs are the same and low when they are binary opposites. Thus, as long as the inputs to exclusive-OR gates 19 are opposite, the output remains low to indicate that the samples at the input and at the 64th stage of shift register 13 are 180 degrees out of phase.

Similarly, the samples at the eighth and 72nd taps are applied by way of leads 17 and 18 to exlusive-OR gate 20, whose output also remains low as long as its inputs are binary opposites.

The outputs of exclusive-OR gates 19 and 20 are combined in NAND-gate 21 whose output goes low when both its inputs become high and remains high otherwise. The low NAND-gate output indicates that the minimum preassigned 22.5° phase-shift has occurred in the received signal.

Flip-flop 26 responds to the low input at point D to force its complementary $\overline{Q}$ output to its high state coincident with the next 614.4 kHz pulse at its C input by way of NAND gate 24. The high output from flip-flop 26 toggles flip-flop 27 to its high stage at output Q after a short delay determined by the short interval between pulses at the 614.4 kHz rate. The next high-speed clock pulse from lead 22 is applied to the C input of flip-flop 27 through inverter 25.

The like high outputs from flip-flops 26 and 27 are combined in NAND-gate 28 and cause the latter output to go low momentarily. The illustrated flip-flop arrangement functions as a digital differentiator. The momentary change of output state in NAND gate 28 activates monopulser (or one-shot multivibrator) 30 to generate a pulse having a duration equal to half the baud interval. By way of specific example, the duration is 1/1200 second. Waveform 38 shown near the output of monopulser 30 is a rectangular pulse with jittery leading and trailing edges due mainly to the differences in phase-change instants between the several dibit codes.

Monopulser 30 provides an inhibit output on lead 23 for the duration of its principal output pulse to prevent further operation of flip-flops 26 for half a baud interval. Thus, the monopulser can be triggered only once during the first half of each baud interval. The inhibit output is applied to NAND-gate 24 through which fast clock pulses are obtained over lead 22.

Phase-locked oscillator 33 is a local oscillator operating nominally at the assigned baud rate, e.g., at 600 Hz in this specific example. As a matter of convenience, the frequency of oscillator 33 can be derived by counting down from the output of fixed oscillator 12 in a well-known manner, since 614.4 kHz is the 1024th harmonic of the baud rate. Oscillator 33 is connected in a loop with fixed delay unit 32 and comparator 31 by way of lead 36. The output of monopulser 30 is connected to another input of comparator 31. Consequently the output of comparator 31 on lead 36 is proportional to the difference in phase between the respective outputs of monopulser 30 and oscillator 33. Fixed delay 32 delays the output of oscillator by the average offset between the actual baud transition and the time the transition is detected in the present apparatus, i.e., about 22.5° or eight counts on shift register 13. Waveform 37, shown near the output of delay unit 32 in the FIGURE, suggests the appearance of its output as substantially free of jitter in contrast to the waveform 38, respresenting the output of monopulser 30.

The phase difference monitored in comparator 31 can be employed in any conventional manner to adjust the phase of oscillator 33. If oscillator 33 has its frequency derived from fixed oscillator 12 by a countdown divider chain, the difference signal from comparator 31 can be used to add and delete pulses in the chain until substantial synchronism is attained.

The steady output of oscillator 33 appearing on output lead 35 is represented in waveform 34 as a square wave at a frequency of 600 Hz with transitions occurring at the center of the baud interval. If a sampling window is required at the center of the baud interval rather than a sharp transition, a fixed 90-degree phase shift can be employed.

While this invention has been described in terms of a specific illustrative embodiment, it is to be understood to be susceptible of modifications by those skilled in the art within the spirit and scope of the appended claims.

What is claimed is:

1. A timing recovery circuit for a differentially coherent phase-shift-keyed synchronous data transmission system employing a carrier wave of substantially constant frequency comprising a delay medium comprising a plurality of storage members for storing a plurality of consecutive samples of a received carrier wave from a transmission medium, a plurality of correlating means each for correlating pairs of samples stored in whose delay medium whose members which are separated by an integral number of half cycles of the frequency of said carrier wave to form an outputs for each positive correlation between pairs of samples, thereby indicating a change of phase in said carrier wave, means for combining the outputs of two or more or said correlating means to form a control signal indicating that an apparent change of phase of said carrier wave is valid and not due to signal distortion, monostable pulsing means controlled by said control signal from said combining means for generating output pulses of predetermined length relative to a synchronous signaling interval, phase-locked oscillator means having an output at the nominal synchronous signaling rate of said system, and means for comparing output pulses from said monostable means with the output of said oscillator to adjust said oscillator toward phase coincidence with the average phase of the output pulses from said monostable means.

2. The timing recovery circuit defined in claim 1 in which said delay medium is a multistage shift register storing as many samples of the received wave for each synchronous signaling interval as are necessary to avoid quantization error and said plurality of correlating means are exclusive-OR gates.

3. The timing recovery circuit defined in claim 1 in which there are two correlating means having a preassigned relative phase displacement less than a quarter cycle of said carrier wave.

4. The timing recovery circuit defined in claim 1 in which said monostable pulsing means inhibits control signals from said combining means for the period when its output pulses are being generated.

5. In combination with a demodulator for synchronous phase-shift-keyed digital data signals modulated on a carrier wave of substantially constant frequency, said demodulator including a delay medium storing a plurality of samples of a received wave extending over more than a half-cycle of said carrier wave, first means for comparing phases measured between pairs of samples points on said delay medium, each pair separated by integral half-cycles of said carrier wave, a failure of comparison being indicated by a change of state in the output of said comparing means, monostable pulsing means triggered by said first comparing means to provide output pulses related to the synchronous data signaling rate, and phase-locked oscillator means having a nominal frequency equal to that of the synchronous data signaling rate and a phase controlled by a second means for comparing responsive to said nominal frequency and said output pulses from said monostable means.

6. The combination set forth in claim 5 in which said delay medium is a shift register having a predetermined fixed number of stages for each half cycle of said carrier wave, and said first comparing means comprises exclusive-OR gates whose inputs are taken from stages of said shift register separated by said fixed number and a coincidence gate combining outputs of at least two such exclusive-OR gates whose respective inputs are collectively separated by less than said fixed number of stages.

* * * * *